United States Patent [19]

Goodrich

[11] Patent Number: 5,333,447
[45] Date of Patent: Aug. 2, 1994

[54] INTEGRATED AIR INJECTION AND EXHAUST GAS RECIRCULATION SYSTEM

[75] Inventor: Michael R. Goodrich, West Chicago, Ill.

[73] Assignee: Senior Engineering Investments, B.V., Amsterdam, Netherlands

[21] Appl. No.: 997,585

[22] Filed: Dec. 28, 1992

[51] Int. Cl.⁵ ........................ F02M 25/06; F01N 3/10
[52] U.S. Cl. .......................................... 60/278; 60/289
[58] Field of Search ......................... 60/278, 289, 290

[56] References Cited

U.S. PATENT DOCUMENTS

| | | | |
|---|---|---|---|
| 3,580,232 | 5/1971 | Sarto | 60/278 |
| 4,088,101 | 5/1978 | Wakita | 60/278 |
| 4,149,377 | 4/1979 | Takagi | 60/278 |

*Primary Examiner*—Douglas Hart
*Attorney, Agent, or Firm*—Dick and Harris

[57] ABSTRACT

A system for integrating air injection and exhaust gas recirculation in the internal combustion engines of vehicles, such as in a contemporary automobile or truck. The integration system includes conduit members connecting a source of pressurized ambient air with the exhaust system of the engine, to supply the ambient air into the exhaust system during deceleration. A flow control member prevents the flow of the exhaust gases backward along the conduit members toward the pressurized air source, during acceleration or cruising to promote flow of the exhaust gases through the EGR valve and into the intake system of the engine.

10 Claims, 1 Drawing Sheet

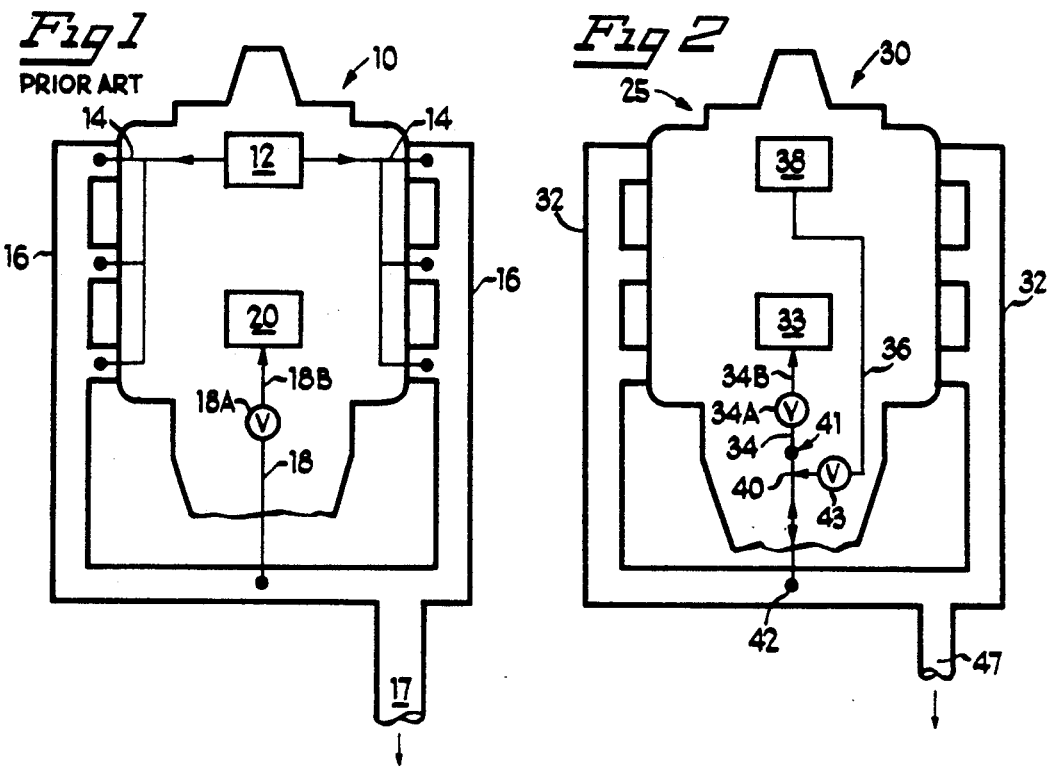
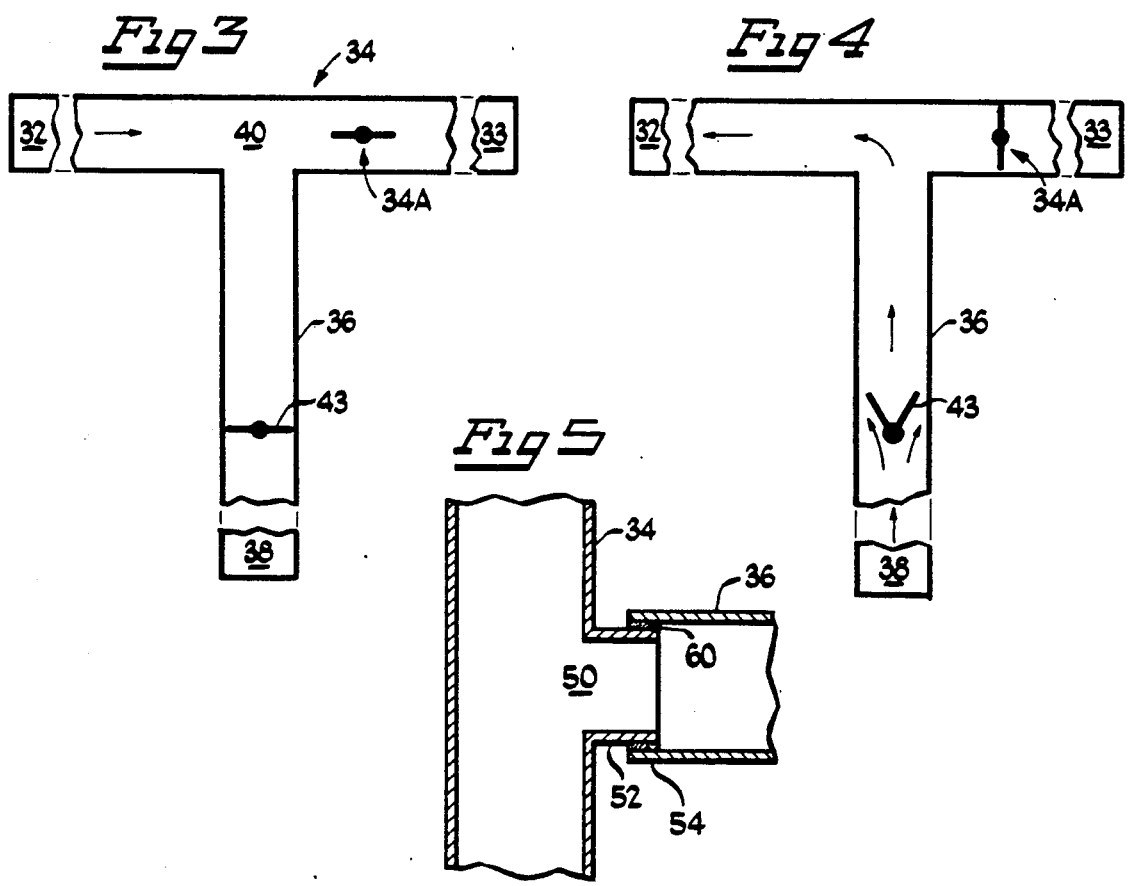

INTEGRATED AIR INJECTION AND EXHAUST GAS RECIRCULATION SYSTEM

BACKGROUND OF THE INVENTION

The present invention is directed to auxiliary systems for internal combustion engines, and in particular to emissions control systems, for motor vehicles.

It has become known that the level of pollutant hydrocarbons, which every hydrocarbon fuel based internal combustion engine produces as a product of combustion, can be reduced, during periods of deceleration or idling, through the injection of oxygen-rich air, which is at ambient temperature, or at least at a temperature substantially below that of the gases in the exhaust manifold. Prior art systems to accomplish this air injection typically employ an air pump and a system of pipes which draws oxygen-rich air from a "cool" air source, such as the ambient air, and channels the oxygen-rich air directly to multiple locations immediately adjacent to the beginning portions of the exhaust manifold, near each cylinder port to promote the combustion of the non- or partially combusted fuel which the exhaust gases contain. The operation of the air pump may be controlled by a solid-state computerized control, as is typically found on current motor vehicles.

Current motor vehicles also employ an exhaust gas recirculation (EGR) system, to redirect a portion of the exhaust gases from the exhaust manifold back into the intake side of the engine, so as to mix with the air going into the engine to lower the combustion temperature and dilute the fuel/air mixture to reduce certain pollutants and to improve fuel economy at cruising speeds. Such recirculation of the exhaust gases is effective and desired particularly during periods of acceleration and steady-state throttle at cruising speeds. A typical exhaust gas recirculation system uses a separate system of high-temperature resistant piping to channel some of the hot gases from the exhaust manifold through an electro-mechanical valve back to the throttle body or the intake manifold. The intake manifold end of the EGR system can employ some form of heat transfer isolation, as the materials of the intake manifold can often be configured from non-high-temperature resistant materials, so as to prevent transfer of heat from the gases directly to the structure of the intake system, prior to mixing of the exhaust gases with the intake air or air/fuel mixture.

The use of separate piping systems for both the air injection system, and the EGR system has the drawback of additional weight, and additional cost of assembly labor and components. For example, each connection of an air pipe to each exhaust manifold port usually employs a threaded fitting, a relatively costly component. Also, each manifold port requires costly machining to receive each air pipe. It is therefore an object of the invention to provide a lower cost integrated air injection/EGR system which can make use of a common piping arrangement, which is capable of directing "cool" oxygen-rich air into the exhaust system, during deceleration or idling periods of operation, and of directing hot exhaust gases into the intake system, during acceleration and cruising periods. The two systems are incapable of operating simultaneously.

It is a further object of the invention to provide such an integrated air injection/EGR system as described, but which protects those portions of the air injection system, such as the air pump, which are sensitive to high temperatures, from the potentially damaging effects of the high-temperature exhaust gases.

Still another object of the invention is to provide such an integrated air injection/EGR system such as described, which additionally protects against the misdirection of the air and exhaust gases through the integrated system.

These and other objects of the invention will become apparent in light of the present Specification, claims and Drawings.

SUMMARY OF THE INVENTION

The present invention comprises a system for integrating an air injection system and an exhaust gas recirculation (EGR) system, into an internal combustion engine, for directing oxygen-rich ambient air which is at a temperature less than an operating temperature of the engine into an exhaust manifold system of the engine during periods of deceleration or idling, and for directing hot exhaust gases into an intake system of the engine during periods of acceleration and cruising. The system for integrating air injection and EGR further comprises pressurized air source means for supplying the oxygen-rich ambient air which is at the temperature less than the operating temperature of the engine. The pressurized air source means is operably configured to supply the air for addition into the exhaust system only during the periods of deceleration or idling. Conduit means operably connects the pressurized air source means to one or more locations along the exhaust system of the engine. Flow control means are operably disposed along the conduit means between the pressurized air source means and the exhaust system, to prevent flow of exhaust gases from the exhaust system toward and into the pressurized air source means, during the periods of acceleration, and in turn, facilitate the flow of exhaust gases from the exhaust system toward the intake system of the internal combustion engine.

In a preferred embodiment of the invention, the EGR system includes a conduit communicating the exhaust manifold of the exhaust system of the internal combustion engine through an EGR valve with the intake system of the engine. The conduit means comprises a tube extending from the pressurized air source means which intersects and is in fluid communication with the EGR conduit so that the tube intersects the EGR conduit between the exhaust manifold side of the EGR conduit and the EGR valve side of the EGR conduit, preferably positioned closer to the exhaust manifold side of the EGR conduit than to the EGR valve side. In particular, the tube intersects the EGR conduit at a position, between the exhaust manifold and the EGR valve, but as close as practical to the exhaust system attachment port.

The intersection between the EGR conduit and the air injection tube further comprises a raised cylindrical boss operably disposed upon and opening into the EGR conduit. The raised boss is further configured to telescopically receive an end of the air injection tube. Sealing means for operably affixing the air injection tube to the raised boss precludes the escape of the air between the boss and the air injection tube. In the preferred embodiment of the invention, the sealing means is a brazed or welded joint.

In the preferred embodiment of the invention, the air injection flow control means comprises a check valve operably disposed along a flow path between the pressurized air source means and the conduit means. The check valve is oriented so as to permit flow only in a direction along the flow path away from the pressurized air source means, only when the pressurized air source means is supplying the air during the periods of deceleration or idling. During the air injection operation, the EGR valve is normally closed which prevents the pressurized injected air flow from reaching the intake manifold. During the periods of acceleration, the pressurized air source means is inactive, and the check valve provides an area of substantially non-moving air between the check valve and the exhaust system, to prevent flow of the less-than-operating-temperature air into the exhaust system, and facilitate the flow of the exhaust gases from the exhaust system through the EGR valve into the intake system.

BRIEF DESCRIPTION OF THE DRAWINGS

FIG. 1 is a schematic representation of a prior art internal combustion engine with separate air injection and exhaust gas recirculation (EGR) systems.

FIG. 2 is a schematic representation of an internal combustion engine with integrated air injection and exhaust gas recirculation systems, according to the present invention.

FIG. 3 is a schematic representation of the flow of exhaust gases during acceleration of the engine.

FIG. 4 is a schematic representation of the flow of low temperature air during deceleration or idling of the engine.

FIG. 5 is a cross-sectional view of the conduit connection of the air injection piping with the exhaust gas recirculation pipe.

DETAILED DESCRIPTION OF THE DRAWINGS

While this invention is susceptible of embodiment in many different forms, there is shown in the drawings and will be described in detail herein a preferred embodiment, with the understanding that the present disclosure is to be considered as an exemplification of the principles of the invention and is not intended to limit the invention to the embodiment illustrated.

FIG. 1 is a schematic representation of a typical prior art internal combustion engine arrangement. Internal combustion engine 10 is shown as having six cylinders. Engine 10 is provided with an air injection system including air pump 12 and air conduits 14. Air conduits 14 directly connect with exhaust manifolds 16 at positions typically immediately adjacent each cylinder, typically using relatively expensive threaded connections (not shown) to ensure a non-leaking, fluid tight connection to prevent escape of hot exhaust gas into the engine compartment. Exhaust manifolds 16 join and direct the exhaust gases to tailpipe 17. Engine 10 also includes an exhaust gas recirculation system including EGR conduit 18, which connects exhaust manifolds 16 with EGR valve 18A, and subsequent EGR pipe 18B which, in turn, connects with intake manifold 20 (the EGR conduit might alternatively lead into a carburetor, or other intake-side component, depending upon the particular engine or vehicle). As can be seen in FIG. 1, a complete set of conduits and connections for the air injection system is provided, which is essentially independent from the exhaust system. Each of the separate conduits, and threaded connections, results in additional cost and weight.

In the operation of the prior art system, during acceleration or cruising periods, the air pump is not engaged, and the EGR valve 18A directs a metered portion of the exhaust gases through the EGR conduits, to feed exhaust gases into the intake side of the engine. During acceleration, the relative pressures in the exhaust manifolds 16 and in the intake manifold 20 are such that flow from exhaust manifolds 16 is promoted along EGR conduit 18 and 18B through the EGR valve 18A and into intake manifold 20. During deceleration or idling periods, however, the EGR valve 18A is closed by computerized controlled electromechanical means such that flow along EGR conduit 18, 18B is prevented. The control of air pump 12 is typically accomplished through the operation of a solid state computerized control which monitors the overall functions of engine 10, in a conventional manner known in the art.

The system 25 for integrating an air injection system and an exhaust gas recirculation system, according to the present invention, is shown in schematic representation in FIG. 2. Internal combustion engine 30 is again shown having six cylinders, which vent exhaust into exhaust manifolds 32, and ultimately to tailpipe 47. EGR conduit 34 and 34B joins exhaust manifolds 32 to EGR valve 34A and intake manifold 33. Air injection conduit 36 connects EGR conduit 34 to air pump 38. For purposes further described hereinafter, in the preferred embodiment of the invention, the intersection 40 of air injection conduit 36 and EGR conduit 34 is physically located at a convenient position between the EGR valve 34A and intersection 42 of EGR conduit 34 and exhaust manifolds 32. A check valve 43 (shown schematically in FIGS. 3 and 4) is arranged in air injection conduit 36, between air pump 38, and intersection 40. Check valve 43 is, in the preferred embodiment of the invention, an automatic, one-way check valve which only permits flow away from air pump 38 toward intersection 40, and may be of any one of a number of known conventional configurations, provided that check valve 43 is configured to be capable of withstanding, for short periods at least, the high temperatures and corrosive effects of the exhaust gases which it will block. Check valve 43 prevents exhaust gases from proceeding through air injection conduit 36 into air pump 38 to preclude against damaging of the air pump 38.

The advantageous operation of system 25 is explained herein in conjunction with FIGS. 3 and 4. During acceleration and cruising (FIG. 3), air pump 38 is not engaged. Accordingly, during acceleration, exhaust gases are driven by the relative pressure differential from exhaust manifolds 32 along EGR conduit 34 and 34B toward intake manifold 33 regulated by EGR valve 34A. As backflow from intersection 40, toward check valve 43, is stopped by the one-way operation of check valve 43, substantially no flow occurs in the length of air injection conduit 36, between check valve 43 and intersection 40.

During deceleration or idling, the engine computer management system closes EGR valve 34A such that air intake manifold 33 no longer tends to draw gases along EGR conduit 34 and 34B from exhaust manifolds 32. In addition, the deceleration or idling condition is sensed by the engine controller, and air pump 38 may be engaged, as required, to pump air along conduit 36 toward and into EGR conduit 34. The air mixes with exhaust gases and in part forces the flow back along conduit 34, and thereafter through the exhaust system to exit from the tailpipe 47.

The present invention also contemplates an improved, simplified connection between the air injection conduit 36 and the EGR conduit 34. In the prior art separated systems, the individual connections of the air injection conduits 14, adjacent each of the cylinders comprised a formed, threaded connection, such as may be formed from machined steel or the like, which was received by a machined threaded bore in the exhaust manifold. The close proximity of the connection to the cylinder exhaust ports means that the temperatures to which the connections are exposed are high, perhaps over 1000 degrees Fahrenheit, such that the use of lower cost materials in that location may be inappropriate or difficult to maintain. The present invention, in its preferred embodiment, employs a single connection at intersection 40, although multiple connections may be employed, as necessary to satisfy flow or space requirements. The connection, shown in FIG. 5, includes aperture 50, integrally formed in EGR conduit 34. Cylindrical boss 52 telescopically receives end 54 of air injection conduit 36. As the connection at intersection 40 is farther down the exhaust path, than the prior art connections, conduits 34 and 36 may be advantageously joined at boss 52 and end 54 by brazing or welding, which is a substantially less expensive and simpler means of providing a connection than the prior art threaded connections.

The integration system of the present invention provides the advantage, over the prior art air injection and EGR arrangement, of a reduction in the number of connections and piping units, and the total length of conduit or piping material used. This results in a reduction in parts, complexity and assembly cost and in overall engine weight. In addition, the simplified single brazed or welded connection between the EGR and air injection conduits additionally eliminates the added cost and weight of a plurality of individual, heavier threaded connections or similar fittings.

The foregoing description and drawings merely explain and illustrate the invention, and the invention is not limited thereto insofar as the appended claims are so limited, as those skilled in the art and having the disclosure before them will be able to make modifications and variations therein without departing from the scope of the invention.

What is claimed is:

1. An apparatus for integrating an air injection system and an exhaust gas recirculation (EGR) system, into an internal combustion engine, for directing air which is at a temperature less than an operating temperature of said engine into an exhaust system of said engine exclusively during periods of deceleration or idling, and for alternatively directing exhaust gases into an intake system of said engine exclusively during periods of acceleration and cruising, said apparatus for integrating air injection and EGR comprising:

pressurized air source means for supplying said air which is at said temperature less than said operating temperature of said engine, said pressurized air source means being operably configured to supply said air for addition into said exhaust system only during said periods of deceleration or idling of said engine, said air from said pressurized air source means being isolation from said exhaust system during said periods of acceleration and cruising;

conduit means operably connecting said pressurized air source means to one or more locations along said exhaust system, said conduit means further operably connecting said exhaust system of said engine to said intake system of said engine; and flow control means operably disposed along said conduit means between said pressurized air source means and said exhaust system, for preventing the flow of exhaust gases from said exhaust system toward and into said pressurized air source means, during said periods of acceleration and cruising, and in turn, facilitating the flow of exhaust gases from said exhaust system toward said intake system of said internal combustion engine.

2. The apparatus for integrating an air injection system and an EGR system, according to claim 1, wherein said EGR system includes a conduit communicating an exhaust manifold of said exhaust system of said internal combustion engine with said intake system of said internal combustion engine wherein said conduit means comprises:

a tube operably extending from said pressurized air source means and intersecting and in fluid communication with said EGR conduit such that said tube intersects said EGR conduit at a position closer to the exhaust manifold side of said EGR conduit, than to the EGR valve and intake system side of said EGR conduit.

3. The apparatus for integrating an air injection system and an EGR system, according to claim 2, wherein said intersection between said EGR conduit and said air injection tube comprises:

a raised cylindrical boss operably disposed upon and opening into said EGR conduit, said raised boss being operably configured to telescopically receive therearound an end of said air injection tube; and sealing means for operably affixing said air injection tube to said raised boss and for precluding the escape of said air between said boss and said end of said air injection tube.

4. The apparatus for integrating an air injection system and an EGR system, according to claim 3, wherein said sealing means comprises a brazed joint.

5. The apparatus for integrating an air injection system and an EGR system, according to claim 3, wherein said sealing means comprises a welded joint.

6. The apparatus for integrating an air injection system and an EGR system, according to claim 1 wherein said flow control means comprises a check valve operably disposed along a flow path between said pressurized air source means and said conduit means, and oriented so as to permit flow only in a direction along said flow path away from said pressurized air source means, only when said pressurized air source means is supplying said air during said periods of deceleration or idling of said engine.

7. The apparatus for integrating an air injection system and an EGR system, according to claim 1 wherein said flow control means comprises a check valve operably disposed along a flow path between said pressurized air source means and said conduit means, and oriented so as to permit flow only in a direction along said flow path away from said pressurized air source means, so as to provide, during said periods of acceleration, when said pressurized air source means is inactive, an area of substantially non-moving air between the check valve and the exhaust system of the engine, so as to prevent passage of said less than engine operating temperature air into said exhaust system and facilitate passage of said exhaust gases to said EGR valve and intake system during said periods of acceleration.

8. An apparatus for integrating an air injection system and an exhaust gas recirculation (EGR) system, into an internal combustion engine, for directing air which is at a temperature less than an operating temperature of said engine into an exhaust system of said engine during periods of deceleration or idling, and for alternatively directing exhaust gases into an intake system of said engine during periods of acceleration and cruising, said apparatus for integrating air injection and EGR comprising:

pressurized air source means for supplying said air which is at said temperature less than said operating temperature of said engine, said pressurized air source means being operably configured to supply said air for addition into said exhaust system only during said periods of deceleration or idling of said engine;

conduit means operably connecting said pressurized air source means to one or more locations along said exhaust system, said conduit means further operably connecting said exhaust system of said engine to said intake system of said engine; and flow control means operably disposed along said conduit means between said pressurized air source means and said exhaust system, for preventing the flow of exhaust gases from said exhaust system toward and into said pressurized air source means, during said periods of acceleration and cruising, and in turn, facilitating the flow of exhaust gases from said exhaust system toward said intake system of said internal combustion engine;

said EGR system including a conduit communicating an exhaust manifold of said exhaust system of said internal combustion engine with said intake system of said internal combustion engine, said conduit means including a tube operably extending from said pressurized air source means and intersecting and in fluid communication with said EGR conduit such that said tube intersects said EGR conduit at a position closer to the exhaust manifold side of said EGR conduit, than to the EGR valve and intake system side of said EGR conduit, said intersection between said EGR conduit and said air injection tube including a raised cylindrical boss operably disposed upon and opening into said EGR conduit, said raised boss being operably configured to telescopically receive therearound an end of said air injection tube; and sealing means for operably affixing said air injection tube to said raised boss and for precluding the escape of said air between said boss and said end of said air injection tube.

9. The apparatus for integrating an air injection system and an EGR system, according to claim 8, wherein said sealing means comprises a brazed joint.

10. The apparatus for integrating an air injection system and an EGR system, according to claim 8, wherein said sealing means comprises a welded joint.

* * * * *